United States Patent [19]
Plauka et al.

[11] 3,873,391
[45] Mar. 25, 1975

[54] METHOD OF FABRICATING A PLASTIC PIPE FITTING

[75] Inventors: John W. Plauka, Martinsville; Edwin A. Cloud, Somerville, both of N.J.

[73] Assignee: Johns-Manville Corporation, New York, N.Y.

[22] Filed: July 19, 1972

[21] Appl. No.: 273,088

[52] U.S. Cl. ................. 156/258, 156/266, 156/280, 156/304, 285/155, 285/156, 285/423, 285/DIG. 16
[51] Int. Cl. ...... B29c 27/00, F16l 41/02, F16l 47/02
[58] Field of Search .......... 156/250, 256, 258, 280, 156/304, 305, 278, 266, 242, 503; 285/155, 156, 423, 15, DIG. 16, DIG. 20, DIG. 10, 179; 29/157 T; 138/145

[56] References Cited
UNITED STATES PATENTS

| | | | |
|---|---|---|---|
| 1,969,588 | 8/1934 | Sweet | 285/179 |
| 2,359,350 | 10/1944 | Bruno | 285/156 |
| 3,116,756 | 1/1964 | Alderson | 285/156 |
| 3,406,055 | 10/1968 | Rubel | 156/275 |
| 3,457,095 | 7/1969 | Doering et al. | 117/5.5 |
| 3,480,493 | 11/1969 | Bauer et al. | 156/278 |

FOREIGN PATENTS OR APPLICATIONS 164,658  1/1954  Australia..................... 285/DIG. 20

Primary Examiner—Charles E. Van Horn
Assistant Examiner—M. G. Wityshyn
Attorney, Agent, or Firm—Robert M. Krone; Stephen C. Shear

[57] ABSTRACT

A method of fabricating a section of pipe fitting from a plurality of subsections and particularly a method of fabricating a non-linear plastic pipe fitting such as, for example, a tee fitting, wye fitting or the like is disclosed herein. The method includes forming predesigned complementary mitered edges in a plurality of plastic pipe subsections so that when the mitered edges engage one another in a complementary fashion, the subsections together take the shape of the desired fitting. The mitered edges are at least temporarily secured into engagement with one another by means of, for example, cement. Thereafter, a liquid mixture coating of elastomer resins such as polyurethane elastomer is applied, preferably by means of spray, to the external surfaces of the pipe subsections at the engaging mitered edges and allowed to set or cure to a tough but slightly resilient coating or band. In this manner, a more uniform coating or band can be readily applied to non-linear, irregular surfaces such as those defined by non-linear fittings.

18 Claims, 4 Drawing Figures

PATENTED MAR 25 1975 3,873,391

METHOD OF FABRICATING A PLASTIC PIPE FITTING

BACKGROUND OF THE INVENTION

The present invention relates generally to the fabrication of plastic pipe sections and more particularly to the fabrication of plastic pipe fittings such as tee fittings, wye fittings, elbow fittings or the like.

As is well known, the particular shape of a given pipe fitting depends upon its intended use. For example, a tee fitting or a wye fitting is generally utilized where one pipe section is tapped into another pipe section. On the other hand, were a change in direction of a given pipe is desired, an elbow fitting or other such direction changing fitting may be utilized. Today, because the pipe industry has, in large part, gone to piping constructed of polyvinyl chloride or other plastic material, it has become desirable to manufacture the fittings by utilizing the same material, that is, polyvinyl chloride or other plastics.

As typical methods of making plastic pipe fittings, the prior art has suggested methods of injection, transfer or compression molding. However, it has been found that the production of such fittings utilizing these methods, especially in the larger diameter sizes of, for example, 10 inch, 12 inch and greater is both difficult and costly. Hence, another suggested method of fabricating plastic fittings such as tees, wyes and the like is to miter cut or otherwise form complementary edges in segments of straight pipe so that when joined together the straight pipe segments form the desired fitting. Typically, these complementary edges are joined together by means of adhesive bonding or plastic welding which, does not always produce a sufficiently strong joint to withstand, for example, rough handling, impact or compressive forces, thereby opening the seams and causing leakage. Heretofore, in order to correct this deficiency, the prior art has suggested utilizing preformed bands or strips of plastic material which are glued, welded or otherwise secured around the joint as well as preformed shrink collars which are also secured around a joint in a tight fitting fashion.

One major drawback in utilizing preformed bands or shrink collars resides in the difficult manner in which they are applied around the adjoining mitered edges of the particular fitting. For example, it is extremely difficult and time consuming to accurately position a preformed band or shrink collar around the adjoining mitered edges of a tee or wye fitting since the edges are not generally perpendicular to the axis of any of the segments making up the fitting. In addition, it is extremely difficult and time consuming to position these preformed bands and shrink collars around the adjoining mitered edges of such fittings in a uniform and reliable fashion.

While the present invention recognizes the advantages of fabricating a plastic pipe fitting utilizing segments of straight pipe in lieu of the more expensive and difficult methods of injection, transfer, or compression molding, it also recognizes the deficiencies in the first mentioned method as well as the deficiencies in utilizing preformed bands or shrink collars. Hence, to overcome these dificiencies while, at the same time, maintaining the advantages in fabricating a plastic pipe fitting from individual segments of straight pipe, the present invention provides a novel method of reinforcing the fitting once the latter has been initially assembled from individual segments.

With regard to one aspect of the present invention, at least two pipe sections are connected together by forming complementary edges in the pipe sections, placing the formed edges into engagement with one another in a complementary fashion so as to form a nonlinear fitting and thereafter applying at predetermined time intervals a plurality of liquid mixture coating layers of flexible resin to the external surfaces of the pipe section over the engaging edges. With regard to another aspect of the present invention, the nonlinear plastic pipe fitting is fabricated by forming a plurality of predesigned complementary mitered edges in at least two plastic pipe sections so that when the mitered edges engage one another in a complementary fashion, the sections together take the shape of the desired nonlinear fitting. The mitered edges may be at least temporarily secured into engagement with one another in the aforesaid complementary fashion and thereafter the liquid mixture coating of flexible resin, preferably polyurethane elastomer, is applied (preferably by means of spraying) onto the external surfaces of the pipe sections over the engaging mitered edges such that the coating is a single continuous coating which extends circumferentially around at least a portion of each section. The liquid mixture is then allowed to set or cure into a tough and slightly resilient coating which provides a strong reinforcing bond around and to the fitting.

By utilizing the foregoing methods in accordance with the present invention, a more uniform coating can be provided around the fitting than is otherwise possible with preformed bands or shrink collars. In addition, these methods set forth an uncomplicated way of providing a band or coating around such nonlinear shaped fittings as tee fittings, wye fittings and the like.

OBJECTS OF THE INVENTION

In accordance with the foregoing, an object of the present invention is to provide a novel method of connecting two pipe sections together.

Another object of the present invention is to provide a novel method of fabricating a nonlinear plastic pipe fitting from individual segments of straight pipe.

Still another object of the present invention is to set forth an uncomplicated method of providing a uniform, single continuous reinforcement band or coating around a plastic fitting such as, for example, a wye fitting, tee fitting, elbow fitting or the like.

These and other objects and features of the present invention will become apparent from the following descriptions.

DETAILED DESCRIPTION OF THE INVENTION

Figure 1:
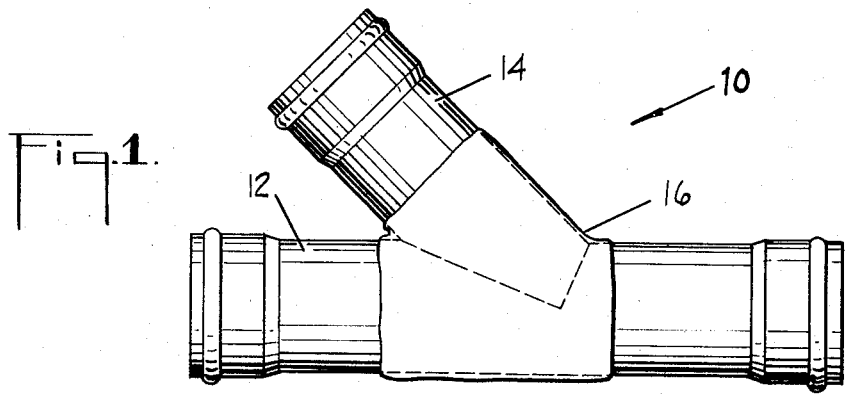
FIG. 1 is a plan view of a wye fitting constructed in accordance with the present invention.

Turning now to the drawing, wherein like components are designated by like reference numerals throughout the various figures, a plastic pipe fitting, specifically a wye fitting, assembled together in accordance with the present invention is illustrated in FIG. 1 and generally designated by the referenced numeral 10. As illustrated in this figure, fitting 10 includes two segments 12 and 14 of straight pipe, each of which is constructed of polyvinyl chloride or other plastic material. The two segments 12 and 14 are connected together in a manner to be described with respect to FIG. 2 so as to form a wye and reinforced in this position by means of a uniform, single continuous reinforcement band or coating 16 which adheres to and accurately contours portions of the external surfaces of the segments over the points at which they engage one another. As illustrated, the band extends circumferentially around at least a portion of each pipe segment.

The band or coating 16, which is preferably an elastomeric or otherwise flexible resin such as, for example, polyurethane elastomer, is initially provided as a liquid mixture coating in accordance with the present invention and uniformly applied in an uncomplicated manner to the rather irregular surfaces of the inner connected pipe segments. It has been found that the band or coating applied to the pipe segments in accordance with the present invention has high tensile strength, tear resistance and abrasion resistance. In addition, the band or coating is self-bonding to the surfaces of the individual pipe segments and cannot be readily peeled off.

Figure 2:
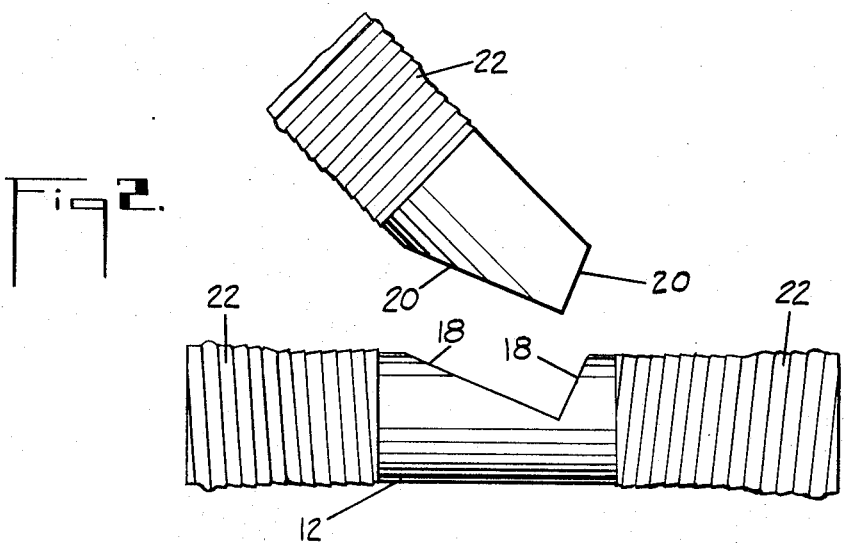
FIG. 2 is a plan view illustrating two segments of straight pipe utilized in the construction of the wye fitting shown in FIG. 1.

Turning now to the novel method in which wye fitting 10 is fabricated, attention is directed to FIG. 2 which illustrates the two straight pipe segments 12 and 14 unassembled from one another. As can be seen in this figure, the segments 12 and 14 have been precisely miter cut so as to provide a plurality of mitered edges 18 and an equal plurality of complementary mitered edges 20, respectively. The exact angle at which the edges are formed will, of course, depend upon the desired shape or configuration of the ultimate fitting. In the case of wye fitting 10, the edges 18 of straight pipe segment 12 have been provided so as to extend into the segment at acute angles with respect to the axis thereof. On the other hand, the edges 20 of segment 14 have been formed so as to mate with edges 18 for providing the wye configuration illustrated in FIG. 1.

Prior to or after the mitered edges 18 and 20 have been provided in respective pipe segments 12 and 14, the latter are preferably thoroughly washed on their outside surface with, for example, methyl ethyl keytone. After checking the plurality of complementary mitered edges 18 and 20 to make sure they accurately engage against one another to form the wye configuration, a solvent cement or other such fastening means is applied to the edges using, for example, a brush, knife, or preferably a caulking gun which emits beads of the material along the edges. If necessary the solvent cement or other material could be tinted to match the color of the pipe segments and thickened by providing a thickening agent. After application of the solvent cement, the pipe segments are fit together and held in place until the cement sets, thereby avoiding slippage. In the event exudation of the cement is on the inner or outer diameter of the pipe segments, it should be immediately wiped smooth over the joint before it dries.

In some cases a gap or offset occurs at the joint due, for example, to misfit of the mitered edges. When this happens, it is preferable to smooth out these gaps or offset, by, for example, applying a caulk of epoxy resin, preferably tinted and thickened in the same manner as the cement. In this manner, a smooth, uniform surface is provided at the joint where the edges meet. If the epoxy caulk is utilized, it is preferable if the same is set for a minimum of four hours or overnight to harden.

After segments 12 and 14 have been at least temporarily assembled together in the foregoing fashion, those areas of the latter which are not to receive a reinforcement band or coating 16 are masked off, as generally indicated by the reference numeral 22 in FIG. 2. Any suitable masking material may be used such as, for example, chip board or cardboard held in place by masking tape, masking tape alone or any other such material which would protect the underlying external surfaces of the pipe segments from the material utilized to produce band or coating 16. In this regard, it is preferable that the masks do not extend exactly to the points where the band or coating will begin. This avoids bridging of the band material onto the mask which would otherwise make ultimate removal of the masking material difficult.

With straight pipe segments 12 and 14 cleaned, at least temporarily assembled together, smoothed at the inner connecting joints and masked in the foregoing manner, attention is directed to the method in which reinforcement band or coating 16 is applied to the unmasked external surfaces of the pipe segments around the joint defined by engaging mitered edges 18 and 20. In accordance with a preferred method, a liquid mixture of polyurethane elastomer is provided along with a curing agent such as methylene di aniline also in liquid mixture form. More specifically, in accordance with a preferred working embodiment of the present invention, the liquid mixture of polyurethane elastomer includes approximately 66% by weight of Adiprene L–167 (a product of DuPont Company) approximately 33% by weight of ethyl acetate and approximately 1% by weight of color concentrates. The catalyst or curing agent in the working embodiment includes approximately 27% by weight of methylene di aniline (a product of DuPont Company) and approximately 73% by weight of ethyl acetate. The liquid mixture of polyurethane elastomer and the catalyst or curing agent are simultaneously applied to the exposed external surfaces of the joined pipe segments 12 and 14 preferably by means of spraying. In the specific working embodiment, the spraying ratio is approximately three parts by volume of the resin solution to one part by volume of the catalyst or curing solution. Spraying may be done by conventional means (not shown).

Once the liquid mixture coating of flexible resin and curing agent (if necessary) have been provided, the spray procedure may commence. This procedure preferably involves a plurality of separate spray coats with predetermined time intervals therebetween. In this way, satisfactory curing or setting is achieved. In the working embodiment, six separate spray coats are provided with a 1 minute drying time between each coat, except that a 2 minute interval is provided after the second coat. This drying time is desirable to prevent excessive solvent entrapment and runs in the buildup of the heavy spray band and film. Excessive wet buildup can produce, for example, splitting of the band due to the powerful forces of shrinkage during drying. The control of coating thickness depends entirely upon the number of actual seconds of spray time per coat and this in turn depends upon the size of the fitting and band or coating area to be coated. For example, with a 10 inch diameter tee and a 10 inch diameter wye, spray times of 45 seconds and 50 seconds, respectively, have been found to be suitable for each coating. On the other hand, spray times of 50 seconds and 65 seconds have been found to be suitable for 12 inch diameter tees and wyes, respectively.

After the reinforcement band or coating 16 has been provided and allowed to set (preferably at ambient temperature) and preferably after it is sufficiently tack free, the masking material 22 is carefully removed. The finished fitting is inspected and cleaned, if necessary. It should be noted that the dried band or coating adheres to the surfaces of the pipe segments which, for the most part, is due to its initial liquid state.

From the foregoing, it should be readily apparent that a single continuous reinforcement band or coating 16 may be easily provided around a fitting without regard to the particular configuration of the latter. For example, unlike the difficulty required in applying a preformed band or shrink collar around, for example, a wye fitting or tee fitting, the method of application in accordance with the present invention is quite uncomplicated even with regard to wye fittings or tee fittings. In addition, it should be equally apparent that the band or coating of the present invention can be uniformly applied around the fitting regardless of its configuration. Further, the thickness of the band or coating can be accurately controlled. Because of these advantages, a more economical, a more reliable and more versitile method of providing a reinforcement band or coating around a fitting, initially constructed of individual segments is provided, regardless of the particular configuration of the fitting.

It is to be understood that the present invention is not limited to the particular liquid mixture coating of flexible resin set forth above, that is, the liquid mixture coating of polyurethane elastomer. For example, other polyurethane solution resin coatings with polyester or polyether reactants requiring no other curing agents can also be used. These polyurethanes can further be compounded with other compatible resins such as, for example, polyvinyl chloride, nitro cellulose, phenoxy, chlorinated rubber and epoxy resins and dissolved in appropriate solvent mixtures for coating application. Further, solutions of other elastomeric or flexible resins such as, for example, polyvinyl chloride, styrene-butadiene, acrylonitrile butadiene-styrene, vinyl toluene-butadiene, or acrylate polymers may be used herein. In addition, it should also be understood that the present invention is not limited to the afore-described spray application of the liquid mixture coating but contemplates, for example, that the mixture may be applied by brush, roller, or knife means.

Figure 3:
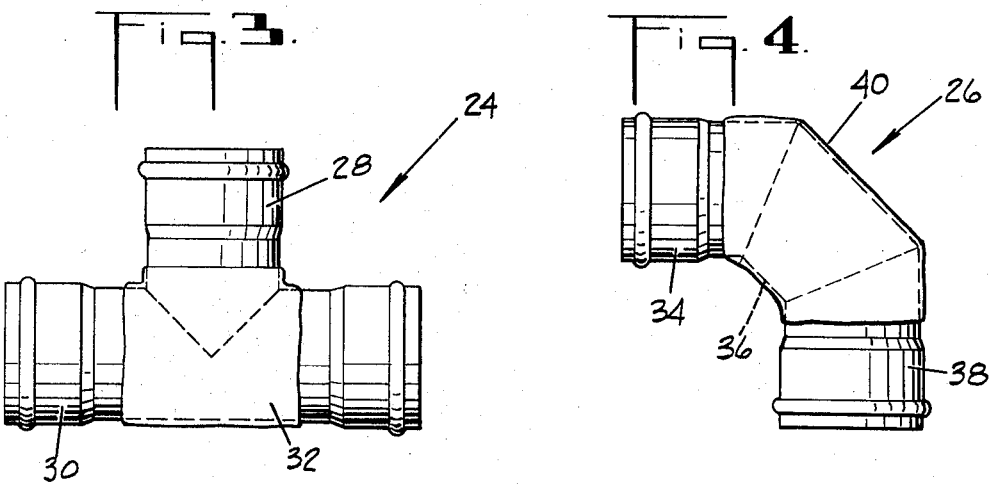
FIG. 3 is a plan view of a tee fitting constructed in accordance with the present invention.
Figure 4:
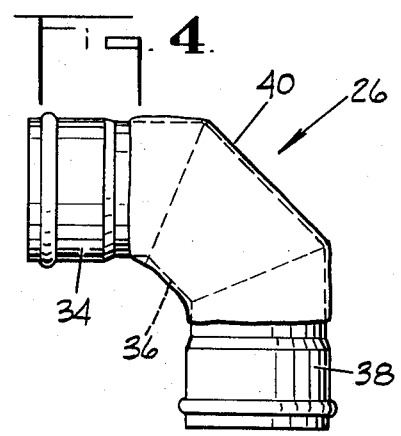
FIG. 4 is a plan view of an elbow fitting constructed in accordance with the present invention.

While the present invention has been described with respect to the fabrication of a wye fitting, it should be readily apparent that one of the advantages of the present invention is that it can be utilized on fittings of different configurations, as stated above. For example, a tee fitting 24 fabricated in accordance with the present invention is illustrated in FIG. 3 and a three-section elbow fitting 26 also fabricated in accordance with the present invention as illustrated in FIG. 4. Like wye fitting 10, tee fitting 24 utilizes two straight pipe segments 28 and 30 having a plurality of appropriately formed complementary mitered edges and assembled together in the foregoing manner to form a tee configuration. A single continuous reinforcement band or coating 32, as illustrated in FIG. 3, is provided circumferentially around the external surfaces of each of the two pipe segments over the joint defined by the engaging mitered edges, in the same manner set forth with respect to wye fitting 10. Elbow fitting 26 is constructed in the same manner, however, utilizing three straight pipe segments 34, 36 and 38 as opposed to only two segments. A reinforcement band or coating 40 is provided in the manner shown in FIG. 4.

It should be readily apparent that the afore-described wye fitting 10, tee fitting 24 and elbow fitting 26 are merely examples of fittings which can be fabricated by the method of the present invention and that this method can be utilized for fabricating fittings of other configurations in an economical, reliable and uncomplicated fashion.

What is claimed is:

1. A method of fabricating a nonlinear plastic pipe fitting, comprising:
    a. forming a plurality of predesigned complementary edges in at least two plastic pipe sections so that when said formed edges engage one another in a complementary fashion, the sections together take the shape of said fitting;
    b. placing said formed edges into engagement with one another in said complementary fashion; and
    c. permanently connecting said sections together by spraying a plurality of liquid mixture coatings of flexible resin to the external surfaces of said pipe sections over said engaging edges such that each of said coatings is a single continuous coating which extends circumferentially around at least a portion of each of said sections and allowing said applied liquid mixture to set.

2. A method according to claim 1 wherein the liquid mixture coatings of flexible resin applied to said pipe sections are liquid mixture coatings of elastomeric resin.

3. A method according to claim 2 wherein said elastomeric resin is a polyurethane elastomer.

4. A method according to claim 1 including;
    a. applying a curing agent to the external surfaces of said pipe sections at said engaging edges substantially simultaneously with the application of said liquid mixture coatings.

5. A method according to claim 1 including:
    a. temporarily fastening said formed edges into engagement with one another in said complementary fashion prior to the application of said liquid mixture coatings.

6. A method according to claim 5 including:
    a. smoothing out any irregularities at said engaging edges after the latter have been at least temporarily fastened together.

7. A method according to claim 1 wherein said liquid mixture coatings are applied to a substantial portion of said pipe sections including over said engaging edges.

8. A method according to claim 1 including;
    a. masking off those areas of said pipe sections not to be coated with said liquid mixture coatings prior to the application thereof.

9. A method according to claim 1 wherein said fitting is a wye fitting.

10. A method according to claim 1 wherein said fitting is a tee fitting.

11. A method according to claim 1 wherein said fitting is an elbow fitting.

12. A method according to claim 1 wherein said coatings are applied only to portions of said sections, said portions including said formed edges.

13. A method of fabricating a nonlinear plastic pipe fitting adapted to join at least two pipes together after said fitting has been fabricated, comprising:
 a. forming a plurality of predesigned complementary mitered edges in at least two plastic pipe sections so that when said mitered edges engage one another in a complementary fashion, the sections together take the shape of said nonlinear fitting;
 b. temporarily fastening said mitered edges into engagement with one another in said complementary fashion; and
 c. permanently connecting said sections together by spraying a plurality of integral liquid mixture coatings of elastomeric resin to the external surfaces of said pipe sections over said engaging mitered edges such that each of said coatings is a single continuous coating which extends circumferentially around at least a portion of each of said sections and allowing said liquid mixture coating to set.

14. A method according to claim 13 wherein said liquid mixture coatings are applied to a substantial portion of said pipe sections including said engaging mitered edges.

15. A method according to claim 14 including;
 a. masking off those areas of said pipe sections not to be coated with said liquid mixture coatings prior to application thereof.

16. A method according to claim 15 including;
 a. smoothing out any irregularities at said engaging edges after the latter have been fastened together but before application of said liquid mixture coatings.

17. A method according to claim 16 wherein said elastomeric resin is a polyurethane elastomer.

18. A method of fabricating a nonlinear plastic pipe fitting, comprising:
 a. forming predesigned complementary edges in a plurality of plastic pipe sections so that when said formed edges engage one another in a complementary fashion, the sections together take the shape of said fitting;
 b. placing said formed edges into engagement with one another in said complementary fashion; and
 c. permanently connecting said sections together by spraying a plurality of liquid mixture coating layers of flexible resin to the external surfaces of said pipe sections over said engaging edges, said layers being sprayed at predetermined time intervals and allowing said applied liquid mixture layers to set.

* * * * *